J. H. C. APPLEGATE.
Dumping Cart.
No. 85,353.
Patented Dec. 29, 1868.
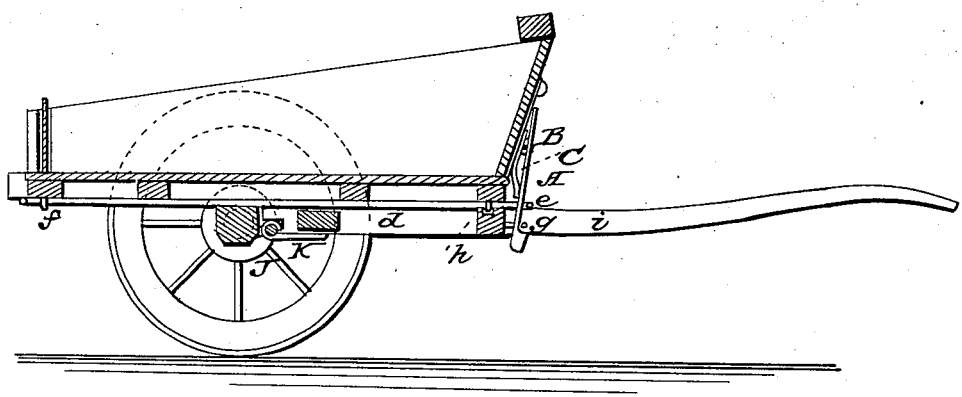

JOSEPH H. C. APPELGATE, OF BRIDGETON, NEW JERSEY.

Letters Patent No. 85,353, dated December 29, 1868.

IMPROVEMENT IN DUMPING-CARTS.

The Schedule referred to in these Letters Patent and making part of the same.

*To all whom it may concern:*

Be it known that I, JOSEPH H. C. APPELGATE, of Bridgeton, in the county of Cumberland, and State of New Jersey, have invented a new and useful Improvement in Dumping-Cart; and I do hereby declare that the following is a full, clear, and exact description thereof, which will enable those skilled in the art to make and use the same, reference being had to the accompanying drawings, forming part of this specification.

This invention relates to an improvement in the method of dumping cart-bodies; and It consists in attaching to the front of the cart a catch of novel construction, which is operated from the rear end of the cart, as will be hereinafter more fully described.

The accompanying drawing represents a cart provided with the catch, the view being a vertical longitudinal section.

A is the catch, which is attached to the front end of the cart-body by a pivot-hinge and bracket, as seen at B.

C represents a spring, which is attached to the bracket, the lower end of which spring bears against the catch A with a constant pressure.

The catch is prevented from being pressed out too far by the detaching-rod d, the forward end of which hooks around the catch, as seen at e.

This rod d extends to the rear end of the cart, where it is confined by staples, as seen at f, so that it may be drawn back, for liberating the catch.

g represents a fastening-staple, attached to the cross-piece h of the shafts i, on which staple the catch latches, as seen in the drawing.

The body of the cart is hinged to the axle J in any substantial manner, so that it will freely turn or dump while it rests on the axle.

It will be seen that the catch A passes down within the fastening-staple g, and that there is play enough in the staple for the catch to be liberated therefrom when drawn back.

Now, by pulling on the rod d from the rear of the cart, the catch will be liberated, and when the front of the cart rises the catch will pass up clear of the staple, and the cart may be dumped without difficulty.

This catch may be applied to any form of body, if the body be properly connected with the cart-axle, for dumping.

I claim as new, and desire to secure by Letters Patent—

The catch A (hinged to the front of the cart-body) and the spring C, the fastening-staple g, and the detaching-rod d, arranged substantially as shown and described, in combination with a dumping-cart, for the purposes specified.

JOS. H. C. APPELGATE.

Witnesses:
JOHN S. MITCHELL,
T. FLETCHER JACOBS.